Nov. 16, 1948.
H. BOARDMAN
2,454,127
MASK WITH ADJUSTABLE SUPPORTING
MEANS FOR PROFILE PROJECTORS
Filed Nov. 14, 1945
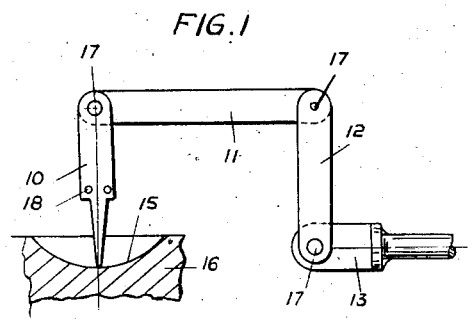
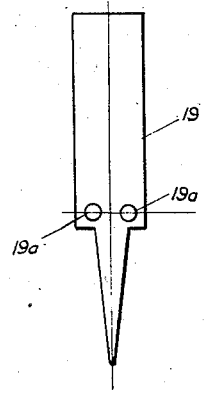
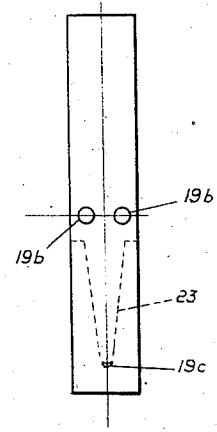
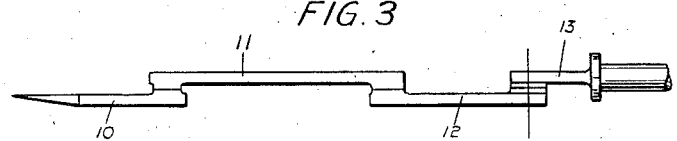
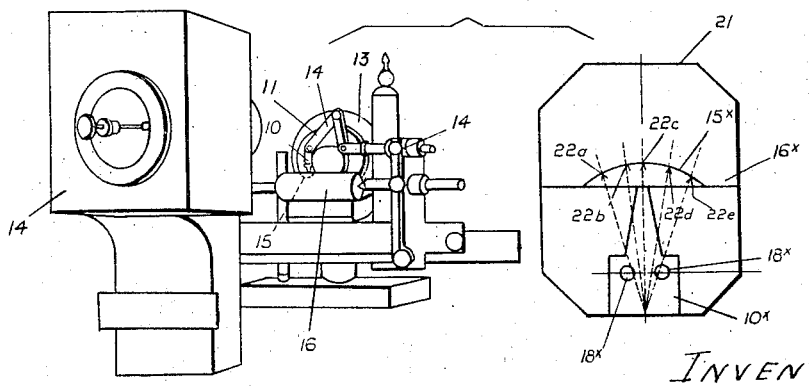
INVENTOR.
HUBERT BOARDMAN.
By: Francis E. Boyce
ATTORNEY.

Patented Nov. 16, 1948

2,454,127

UNITED STATES PATENT OFFICE 2,454,127

MASK WITH ADJUSTABLE SUPPORTING MEANS FOR PROFILE PROJECTORS

Hubert Boardman, Rochdale, England

Application November 14, 1945, Serial No. 628,600
In Great Britain November 18, 1944

5 Claims. (Cl. 88—24)

This invention relates to profile projectors, and particularly to the type used for the inspection of parts constructed to very fine limits of accuracy by known engineering processes.

It is well known in various engineering trades, to inspect parts by projecting the profile of a part on to a screen, whereby the silhouette or image of the profile being inspected is reproduced to an enlarged scale, so that the silhouette can be measured and inaccuracies easily detected.

One disadvantage of profile projection for the purpose specified is that it is impossible for the light rays of the projector to reach the profile of inaccessible parts, for example, the shape of slots, keyways, internal screw-threads, etc. to enable the profile of said part to be reproduced on the screen, due to the light rays being interrupted by metal or other material intermediate of the light and the profile.

Attempts have been made to overcome this disadvantage, and probably the best known is by means of a pantograph machine, whereby the shape of a slot, key-way or screw thread or other normally inaccessible profile can be traced and reproduced on a smoked glass slide, the slide being afterwards placed in a profile projector and the traced shape reproduced on a screen. This method of reproducing the shape of normally inaccessible profiles whilst being good also has a disadvantage, in that any inaccuracies in the pantograph machine are multiplied proportional to the extent of enlargement of the image or silhouette on the screen.

The object of the present invention is to provide an improved apparatus for reproducing an inaccessible profile by means of a profile projector, whereby the silhouette or image produced on the screen is a more exact and accurate replica of an inaccessible profile.

The invention comprises an apparatus for reproducing on a screen the equivalent of an image or silhouette of a profile normally inaccessible to light rays of a profile projector comprising the steps wherein a mask is provided adapted to be engaged with the said profile so that the silhouette of part of such mask is projected onto the screen and wherein a template is provided which is a replica of the image of the hidden profile-contacting portion of the mask and as much of the rest of the mask as is necessary for the template to be placed congruent with the silhouette of the mask, placing the template in such congruent positions for a series of positions of the mask and marking on the screen such contours of the hidden portions of the mask for each position.

According to the invention, means for use with a profile projector for recording on a screen the equivalent of an image or silhouette of a profile normally inaccessible to the light ray of the projector, comprises a mask, adapted to set in different positions in contact with the said profile means for supporting said mask in such positions and a template which is a replica of the image of that part of the mask engaging the profile and having means whereby it may be placed on the screen congruent with the incomplete image of the mask so that the silhouette of the hidden profile-contacting portion of the mask may be recorded on the screen for a plurality of different positions of the mask and the contours of the hidden profile obtained therefrom.

In the accompanying drawings:

Fig. 1 is a front elevation of the mask and supporting links constructed in accordance with the invention, and shown separate from the profile projector.

Fig. 2 is a detail sectional view.

Fig. 3 is a plan view illustrating the development of the mask and links shown in Fig. 1.

Fig. 4 is a front view of the template or replica of the image or silhouette of the mask shown in Fig. 1.

Fig. 5 is a view similar to Fig. 4 but showing a modified form of template.

Fig. 6 is a perspective view showing a profile projector incorporating the mask according to the invention.

In the preferred example according to the invention, and as illustrated in the drawings, the mask comprises a tapered pointer 10 pivoted to a series of pivoted links 11, 12, 13, the link 13 being attached to the profile projector 14, the arrangement being such that the mask 10 is capable of moving in a vertical plane so as to make contact with any point on the normally inaccessible profile 15 cut in the workpiece 16 whilst disposed so as to cut the rays of light from said projector. The links are pivoted together by means of the friction joint 17 shown in Fig. 2 whereby the mask can be located in any adjusted position. A plurality of round countersunk holes 18 are drilled through the mask for a purpose to be later described, and such holes may be located as shown in Fig. 1 or may be drilled at intervals along the length of the mask whilst the tip of said mask may be bevelled to a sharp edge, as shown in Fig. 3.

The template or replica 19 of the image of the mask 10, as shown in Fig. 4, is in outline the exact shape of said mask, but of a size commensurate with the size of the image or silhouette of the pointer when thrown on the screen by the profile projector. For example, if it is required to multiply the silhouette fifty times full size, then the replica will be fifty times the size of the pointer. The template is fashioned from sheet metal, and has locating holes 19$^a$, 19$^a$ cut therein. Obviously, the replica may be cut from cardboard, fibre board, or any other suitable sheet material. As shown in Fig. 5, the replica could be fashioned so as to be different in outline from the mask provided some means such as the holes 19$^b$, 19$^b$ and shaped slot 19$^c$ corresponding to the mask tip are available for locating the replica congruent to the image or silhouette of the mask on the screen 21.

In operation, and as illustrated in Fig. 6, the work-piece 16 containing the inaccessible profile 15 it is required to test or examine, is placed in position in the profile projector 14, and the mask 10 is disposed so as to cut the rays of light from said projector whilst the mask tip rests on the first point on the inaccessible profile. The partial image of the mask projected on the screen is marked 10$^x$, and the image of the workpiece 16$^x$. The projected image of the mask and workpiece are shown inverted on the screen, but this is due merely to the lens characteristics. The light rays pass through the holes 18, 18 in the pointer, and the circular discs of light 18$^x$, 18$^x$ falling on the screen 21 mark the position to be occupied on the screen by the template 19, i. e. the template is so positioned that the holes 19$^a$, 19$^a$ therein are coincident with the circular discs of light 18$^x$, 18$^x$ on the screen 21, so that the template is placed congruent with the image of the mask. Whilst the template is so disposed, a mark 22$^a$ is placed on the screen indicating the exact position of the image of the tip of the mask. The mask is placed in turn on each point of the inaccessible profile 15, and at each point the template is correspondingly disposed on the screen, and each position of the template tip marked on the screen, with the result that a series of points 22$^a$, 22$^b$, 22$^c$, 22$^d$, 22$^e$ are marked on the screen which when joined together will be an enlarged and exact reproduction 15$^x$ of the inaccessible profile 15, and said reproduction can be examined or inspected at will. It will be understood that as the mask traces the shape of the inaccessible profile it may be that some of the holes in the pointer will be screened from the light rays by the intervening metal, but so long as two or more holes are cutting said light rays resulting in two or more discs of light on the screen, the position to which it is required to dispose the template can be accurately indicated and the mark corresponding to the tip thereof drawn on the screen.

From the above it will be seen that even if there is unintentional relative movement of the pivot or pivots or other part of the supporting mechanism for the mask when moving the latter from one position to the next, such movement will not introduce an error in the reproduction of the profile on the screen as any consequent change of position of the mask will itself appear on the screen and the template will be placed exactly with the same relative change of position for the correct location of its point. Thus errors in the supporting mechanism are not reproduced or multiplied on the screen.

Obviously the holes in the mask and template can be of any geometric shape and either all the same or different for identification. Also, in the replica the holes could be indicated by surface marking instead of being actual holes, or as indicated at 23 in Fig. 5, the template could be larger in area than the projected image or silhouette of the mask, and the outline of the image of the profile-contacting part of the mask could be surface marked on the template to assist the correct location of the same on the screen. Alternatively, a plurality of gaps may be cut in the edges of the mask and/or cut or indicated in the template, or a combination of both holes and gaps or any other known form of sighting may be utilised, or as indicated in Figs. 1 and 4, the mask and template may be formed with shoulders in addition to the apertures. The template may be constructed with a marking device which may conveniently be operable whilst both hands may be engaged in holding it in register with the projected image or shadow. The replica could be shaped in the form of a stencil to facilitate marking of the screen.

I declare that what I claim is:

1. Means for use with a profile projector for producing a chart the equivalent of an image or silhouette point by point of a profile normally inaccessible to the light ray of the projector, comprising a mask adapted to set in different positions in contact with the said profile, means for supporting said mask in such positions, and a template which is a replica of the image of that part of the mask engaging the profile, said mask and template having means whereby the template may be placed on the chart congruent with the incomplete image thereon of the mask so that the silhouette of the hidden profile-contacting portion of the mask may be recorded on the chart for a plurality of different positions of the mask and the contours of the hidden portion of the profile obtained therefrom.

2. Means for use with a profile projector for producing a chart the equivalent of an image or silhouette point by point of a profile normally inaccessible to the light ray of the projector, comprising a mask adapted to set in different positions in contact with the said profile, means for supporting said mask in such positions, and a template which is a replica of the image of that part of the mask engaging the profile, said mask and template having means whereby the template may be placed on the chart congruent with the incomplete image thereon of the mask so that the silhouette of the hidden profile-contacting portion of the mask may be recorded on the chart for a plurality of different positions of the mask and the contours of the hidden portion of the profile obtained therefrom, said mask comprising a tapered pointer supported by a series of pivoted links so as to be capable of moving in a vertical plane normal to the light rays of the projector.

3. Means for use with a profile projector for producing a chart the equivalent of an image or silhouette point by point of a profile normally inaccessible to the light ray of the projector, comprising a mask adapted to set in different positions in contact with the said profile, means for supporting said mask in such positions, and a template which is a replica of the image of that part of the mask engaging the profile, said mask and template having means whereby the template may be placed on the chart congruent with the incomplete image thereon of the mask so that the silhouette of the hidden profile-contacting portion of the mask may be recorded on the chart for a plurality of different positions of the mask and the contours of the hidden portion of the profile obtained therefrom, characterised in that the mask has a plurality of holes drilled therein through which the light rays can pass to form indications on the chart for location of the template congruent with the incomplete image on the chart, the template having holes or markings for placing in register therewith.

4. Means for use with a profile projector for producing a chart the equivalent of an image or silhouette point by point of a profile normally inaccessible to the light ray of the projector, comprising a mask adapted to set in different positions in contact with the said profile, means for supporting said mask in such positions, and a template which is a replica of the image of that part of the mask engaging the profile said mask and template having means whereby the template may be placed on the chart congruent with the incomplete image thereon of the mask so that the silhouette of the hidden profile-contacting portion of the mask may be recorded on the chart for a plurality of different positions of the mask and the contours of the hidden portion of the profile obtained therefrom, said mask comprising a tapered pointer supported by a series of pivoted links so as to be capable of moving in a vertical plane normal to the light rays of the projector, said mask having a plurality of holes drilled therein through which the light rays can pass to form indications on the chart for location of the template congruent with the incomplete image on the chart, the template having holes or markings for placing in register therewith, characterised in that the template is cut to the shape of the projected image or silhouette of the mask.

5. Means for use with a profile projector for producing a chart the equivalent of an image or silhouette point by point of a profile normally inaccessible to the light ray of the projector, comprising a mask adapted to set in different positions in contact with the said profile, means for supporting said mask in such positions, and a template which is a replica of the image of that part of the mask engaging the profile, said mask and template having means whereby the template may be placed on the chart congruent with the incomplete image thereon of the mask so that the silhouette of the hidden profile-contacting portion of the mask may be recorded on the chart for a plurality of different positions of the mask and the contours of the hidden portion of the profile obtained therefrom, said mask comprising a tapered pointer supported by a series of pivoted links so as to be capable of moving in a vertical plane normal to the light rays of the projector, said mask having a plurality of holes drilled therein through which the light rays can pass to form indications on the chart for location of the template congruent with the incomplete image on the chart, the template having holes or markings for placing in register therewith, characterised in that the template is larger in area than the projected image or silhouette of the mask and bears an outline or shape of a substantial part of such image or silhouette to facilitate its congruent registration on the chart.

HUBERT BOARDMAN.

REFERENCES CITED

The following references are of record in the file of this patent:

UNITED STATES PATENTS

| Number | Name | Date |
|---|---|---|
| 1,157,796 | Morehouse | Oct. 26, 1915 |
| 1,589,349 | Bausch et al. | June 22, 1926 |
| 1,732,730 | Porter et al. | Oct. 22, 1929 |
| 2,192,529 | Thomas et al. | Mar. 5, 1940 |
| 2,356,274 | Roger | Aug. 22, 1944 |
| 2,381,634 | Back | Aug. 7, 1945 |